(12) United States Patent
Way (10) Patent No.: US 12,510,343 B2
(45) Date of Patent: Dec. 30, 2025

(54) DECIMAL MEASUREMENT SCALE

(71) Applicant: James Wesley Way, Fairfax, VA (US)

(72) Inventor: James Wesley Way, Fairfax, VA (US)

(*) Notice: Subject to any disclaimer, the term of this patent is extended or adjusted under 35 U.S.C. 154(b) by 411 days.

(21) Appl. No.: 18/312,617

(22) Filed: May 5, 2023

(65) Prior Publication Data

US 2024/0369338 A1  Nov. 7, 2024

(51) Int. Cl.
*G01B 3/02* (2020.01)
*G01B 3/1003* (2020.01)

(52) U.S. Cl.
CPC ............. *G01B 3/1003* (2020.01); *G01B 3/02* (2013.01)

(58) Field of Classification Search
CPC . G01B 3/02; G01B 3/04; G01B 3/004; G01B 3/006; G01B 3/1061
USPC ................................ 33/494, 679.1, 759, 769
See application file for complete search history.

(56) References Cited

U.S. PATENT DOCUMENTS

| | | |
|---|---|---|
| 115,019 A | 5/1871 | Bostock |
| 230,619 A | 8/1880 | Darling |
| 289,512 A | 12/1883 | Darling |
| 291,429 A | 1/1884 | Tuttle |
| 708,355 A | 9/1902 | Hartley |
| 809,950 A | 1/1906 | Heysinger et al. |
| 1,409,723 A | 3/1922 | Jacob |
| 1,907,923 A | 5/1933 | Willis |
| 2,728,143 A | 12/1955 | Buchet |
| 4,200,990 A | 5/1980 | West |
| D267,932 S | 2/1983 | Sidrak |
| 4,551,923 A | 11/1985 | Sung |
| 4,641,436 A | 2/1987 | Tzen et al. |
| 4,734,993 A | 4/1988 | Pan |
| 4,750,270 A | 6/1988 | Kundikoff |
| D313,762 S | 1/1991 | Chan et al. |
| D316,978 S | 5/1991 | Chesson et al. |

(Continued)

FOREIGN PATENT DOCUMENTS

| | | |
|---|---|---|
| CN | 108180801 A | 6/2018 |
| CN | 109186393 A | 1/2019 |

(Continued)

OTHER PUBLICATIONS

Way, James W. Decimal Scale With Alternating Graduations. Research Disclosure. Database No. 688014; Jul. 5, 2021. Aug. 2021 paper journal, edition 688, pp. 2121 and 2122; ISSN 0374-4353. Published by Questel Ireland Ltd., Killernan, Kilmaine, County Mayo, Ireland.

(Continued)

*Primary Examiner* — George B Bennett (57) ABSTRACT

The decimal scale for a linear or angular measuring instrument consists of a fine scale extending to the edge, and a simple scale parallel to the edge. The longest graduations span from the edge to the simple scale, and each midpoint between them is indicated by a mark on the simple scale line. The graduations of the fine scale have an alternating pattern, so that each graduation is adjacent to another of a different length. A series of numerals refer to the graduations at regular intervals. If these numerals increase to one thousand or above, and there is limited lateral space, the last three digits are placed in a different row from the first portion of the numeral.

6 Claims, 7 Drawing Sheets

(56) References Cited

U.S. PATENT DOCUMENTS

| | | | |
|---|---|---|---|
| 5,335,421 A * | 8/1994 | Jones, Jr. | G01B 3/004 |
| | | | 33/759 |
| D371,978 S | 7/1996 | Ekeoba | |
| 5,666,737 A | 9/1997 | Ryan, III | |
| 5,771,598 A | 6/1998 | Lassberg | |
| 5,825,459 A | 10/1998 | Rubin | |
| 5,875,557 A | 3/1999 | Ueki | |
| D408,748 S | 4/1999 | Bedol et al. | |
| D436,872 S | 1/2001 | Hoshino et al. | |
| D436,873 S | 1/2001 | Hoshino et al. | |
| D439,531 S | 3/2001 | Davis et al. | |
| 6,247,240 B1 | 6/2001 | Economaki | |
| D447,965 S | 9/2001 | Groiso | |
| 6,311,408 B1 * | 11/2001 | Madayag | A41D 27/20 |
| | | | 33/1 G |
| 6,457,247 B1 | 10/2002 | Lin | |
| 7,076,881 B1 * | 7/2006 | Perry | G01B 3/04 |
| | | | 33/434 |
| 7,100,295 B1 | 9/2006 | Chang | |
| 7,533,473 B2 * | 5/2009 | Chua | E04G 21/1891 |
| | | | 33/759 |
| D682,127 S | 5/2013 | Wood | |
| 8,438,744 B1 | 5/2013 | Mann | |
| D711,259 S | 8/2014 | Garashi | |
| D711,260 S | 8/2014 | Igarashi | |
| D734,186 S | 7/2015 | Ringlein | |
| 9,823,055 B2 * | 11/2017 | Cromwell | G01B 3/1003 |
| 10,228,227 B2 | 3/2019 | Kawashima | |
| D845,796 S | 4/2019 | Yamashita | |
| 10,352,677 B2 | 7/2019 | Stewart et al. | |
| 10,429,163 B2 | 10/2019 | Liang | |
| 11,161,365 B1 * | 11/2021 | Garza | B43L 7/02 |
| 11,320,249 B2 | 5/2022 | Hall | |
| 11,618,984 B2 * | 4/2023 | McCormick | D05B 35/12 |
| | | | 33/566 |
| 11,796,294 B2 | 10/2023 | Aldrich | |
| 12,144,335 B2 * | 11/2024 | Soderquist | A01K 97/20 |
| 12,287,192 B1 * | 4/2025 | Mann | G01B 3/006 |
| 2003/0019116 A1 | 1/2003 | DeWall | |
| 2018/0172414 A1 * | 6/2018 | Kawashima | G01B 3/22 |
| 2022/0196375 A1 * | 6/2022 | Capon | G01B 3/1061 |
| 2024/0247924 A1 * | 7/2024 | Erdfarb | G01B 3/1003 |

FOREIGN PATENT DOCUMENTS

| | | |
|---|---|---|
| FR | 1145750 A | 10/1957 |
| GB | 2282888 A | 4/1995 |
| GB | 2304194 B | 12/1998 |
| JP | 151655/1975 U1 | 12/1975 |
| JP | H08-178601 A | 7/1996 |
| JP | 2013-057528 A | 3/2013 |
| JP | 2017-198597 A | 11/2017 |
| KR | 10-2022-0164185 A | 12/2022 |
| WO | 2012/023196 A1 | 2/2012 |
| WO | DM/083 638 S | 6/2014 |

OTHER PUBLICATIONS

Oregon Rule Co., Full-Line Catalog, copyright 2019. Adhesive polyester rules, p. 12, Millimeter Regular (MMR). Oregon City, Oregon, USA. Website: https://oregonrule.com.

* cited by examiner

DECIMAL MEASUREMENT SCALE

TECHNICAL FIELD

The present invention pertains to measuring instruments such as rulers, measuring tapes and protractors. More specifically, it pertains to the scales, graduations and indicia of these instruments.

BACKGROUND ART

Metric rulers and measuring tapes often use a conventional decimal graduation scale. The longest graduation lines recur every ten millimeters, while the second longest are between them at each halfway point. The remaining graduations, in two groups of four, are the smallest and identical.

The many identical graduations can be difficult to distinguish. This especially applies to the millimeters ending in two or three, as well as seven or eight, since they are located in the middle of each group. These difficulties also apply to protractors, since they often use the same configuration.

A fractional inch ruler has graduations that alternate in length. There is a problem with replicating this on a metric ruler. If every other graduation is lengthened, showing a division into fifths, the halfway point will not be emphasized.

The proposed solutions to this dilemma include adding small numbers or dots to assist in identifying specific graduations. The applicant published an idea like this in the August 2021 edition of Research Disclosure, titled "Decimal Scale With Alternating Graduations."

In this defensive publication, the unnumbered graduations in an even numeric position (2, 4, 6 and 8) are longer than those in an odd numeric position (1, 3, 5, 7 and 9). The middle graduation (5) is topped by a small dot or arrow for emphasis.

Over time, certain problems have become apparent with this idea. First, it is harder to make this at the actual size on a metric ruler, since the small dots or arrows must not touch the adjacent graduations. Second, this idea is not practical if the graduations have a closer spacing than millimeters. And third, ornaments like this can be distracting. Measuring instruments are often easier to use when they are constructed with simplicity.

Another issue that applies to metric distance measurement is whether the numerals should indicate centimeters or millimeters. Centimeter numeration fits more easily into the available space on a metric ruler, but millimeter numeration allows integers to represent a finer grade of measurement. Also, the preferred metric prefixes enlarge or reduce the magnitude of a unit in steps of one thousand.

On a measuring tape with millimeter numeration, one thousand is equal to one meter. Due to limited space, the complete numerals usually occur at hundred millimeter intervals. Between these, the numerals will be abbreviated, showing only the final two digits. If the complete numeral could be shown every time, and at a readable size, there would be less of a chance for error.

Compared to fractional inches, metric tools are mathematically easier, but they have drawbacks in other areas. Consequently, there is a clear need for improved decimal measuring instruments that solve the problems mentioned above.

SUMMARY

The present invention applies to decimal linear or angular measuring instruments of analogous construction. The main graduation lines are indicated by a series of numerals at regular intervals, such as every ten millimeters for linear measurement. For angular measurement, this would be every ten degrees, or as an alternative, every tenth of a radian. This invention includes a fine scale that extends to the edge, and a simple scale that is parallel to the edge.

Between the main graduation lines, those unnumbered graduations in an even numeric position are of intermediate length, while those in an odd numeric position are shorter. If these graduations are subdivided further, such as into half-millimeter increments, then these additional graduations will be the shortest. This comprises the fine scale, and the alternating pattern makes the graduations easier to discern.

The simple scale runs parallel to the edge, in between the numerals and the fine scale graduations. The simple scale could be straight as with a ruler, or curved and follow the edge of a protractor. Only the longest main graduation lines will connect with or cross the simple scale. The only other marks on the simple scale are exactly halfway between the main graduation lines, pointing towards the edge. These marks align with and emphasize each graduation at the halfway point on the fine scale, since these are now among the shorter graduations.

A second aspect of the invention is when millimeter numeration is used on a measuring tape. Beginning at one thousand millimeters, the numerals are separated into three digit groups. The last three digits are placed in a different row from the first portion of the numeral. The accumulated millimeters are now indicated in their entirety every time, and the numerals can be made at a size that is easier to read.

DETAILED DESCRIPTION OF THE DRAWINGS

The applicant provides a unique decimal measurement scale so that closely spaced graduations can be more easily discerned. This new scale also incorporates a novel configuration for large numerals at longer distances. This is described in enabling detail in the following examples, which may represent more than one embodiment of the present invention.

Figure 1A:
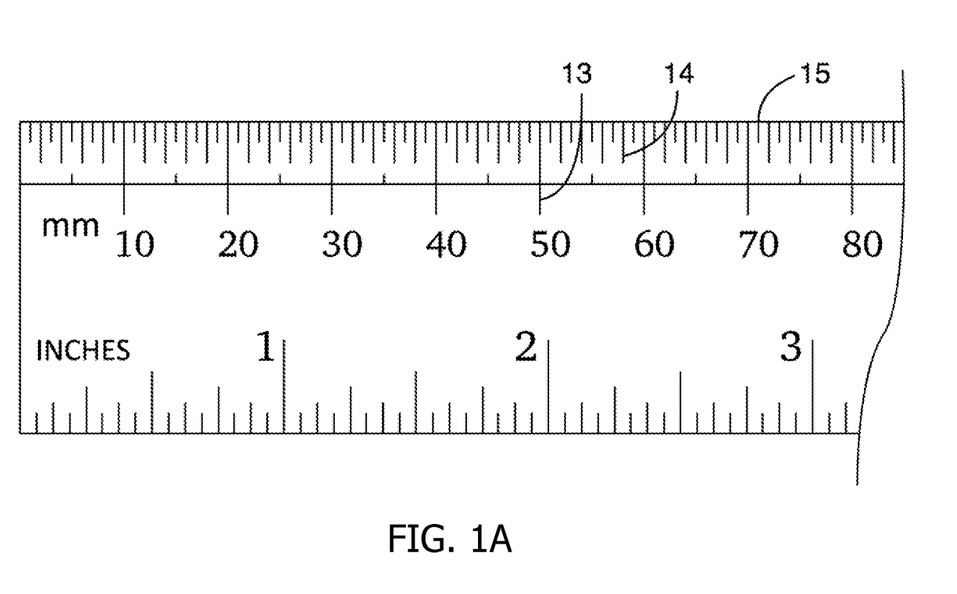
FIG. 1A is a plan view of the beginning of a ruler with a metric scale on the top edge according to an embodiment of the present invention.
Figure 1B:
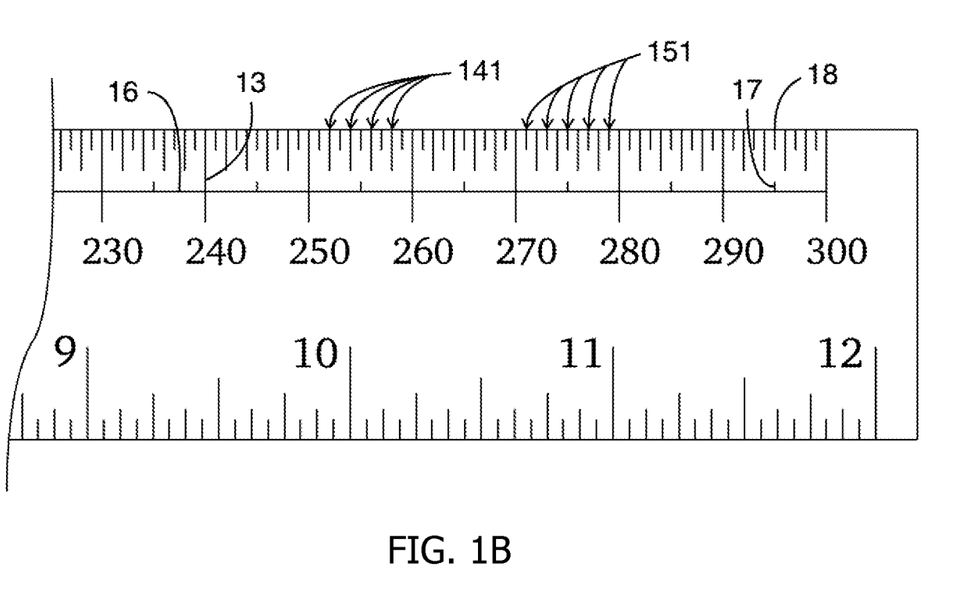
FIG. 1B is a plan view of the end of the ruler of FIG. 1A.

Referring to FIGS. 1A and 1B, these comprise the beginning and end portion of a ruler. The bottom edge is graduated in standard fractional inches, while the top edge of both figures includes the present invention. On FIG. 1A, between the longest graduation lines every tenth millimeter 13, the remaining millimeters ending with an even digit are of intermediate length 14, while the millimeters corresponding to an odd digit are the shortest 15, which constitutes the fine scale.

This is shown again more fully in FIG. 1B, where the longer unnumbered graduations 141 end with an even digit, and the several shorter graduations 151 end with an odd digit. Aligned with and parallel to the graduated edge is the simple scale 16, and every tenth millimeter 13 crosses this scale towards the center. Along the simple scale 16, situated halfway between the numbered millimeters 13, are a series of marks 17. These face the edge only, and point to the millimeters ending in five 18, which are among the shorter graduations. In this manner, the halfway point is still emphasized for the end user.

Figure 2A:
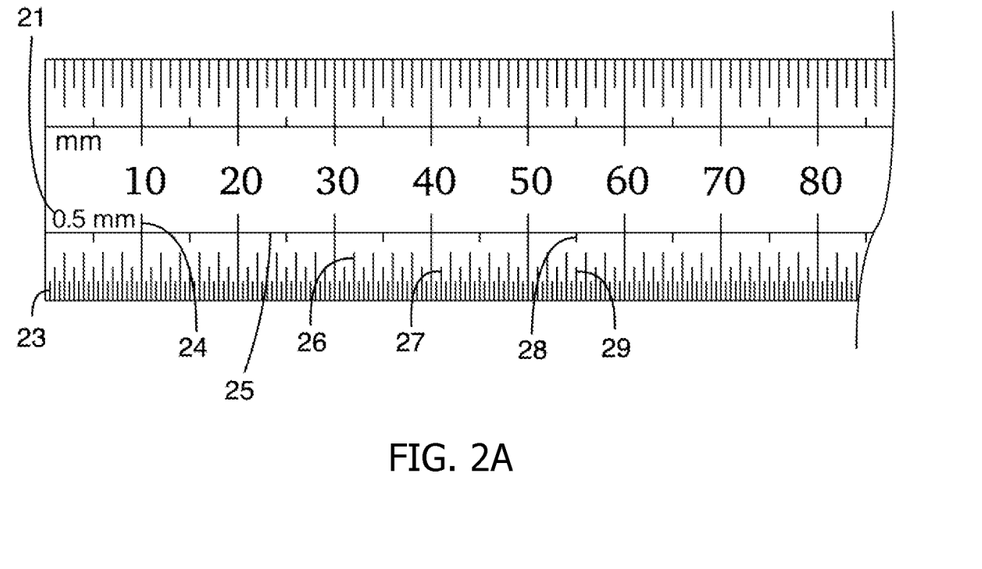
FIG. 2A is a plan view of the beginning of a steel rule that has a metric scale on both edges according to a further embodiment of the present invention.

Referring to FIG. 2A, this comprises the beginning portion of a metric steel rule used by engineers and machinists. Both the top and bottom edge include the present invention, while the bottom edge also includes half-millimeter increments 21, which are the shortest graduations 23 in this embodiment.

Figure 2B:
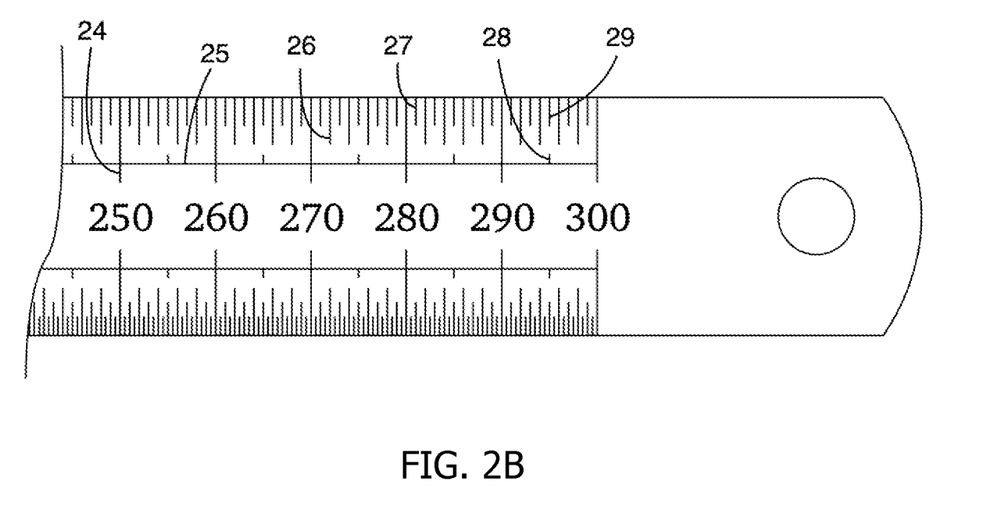
FIG. 2B is a plan view of the end of the steel rule of FIG. 2A.

The remaining elements relate to the integer graduations on the bottom edge of FIG. 2A, and correspond to similar scale elements on the top edge of FIG. 2B. The longest graduation lines 24 point towards the center, crossing the simple scale parallel to the edge 25. The remaining millimeter graduations that correspond to an even integer 26 are longer than the other millimeter graduations that correspond to an odd integer 27. Connected to the simple scale 25 are a series of marks 28, and these point towards the edge to each millimeter graduation corresponding to an integer ending in five 29.

Figure 3:
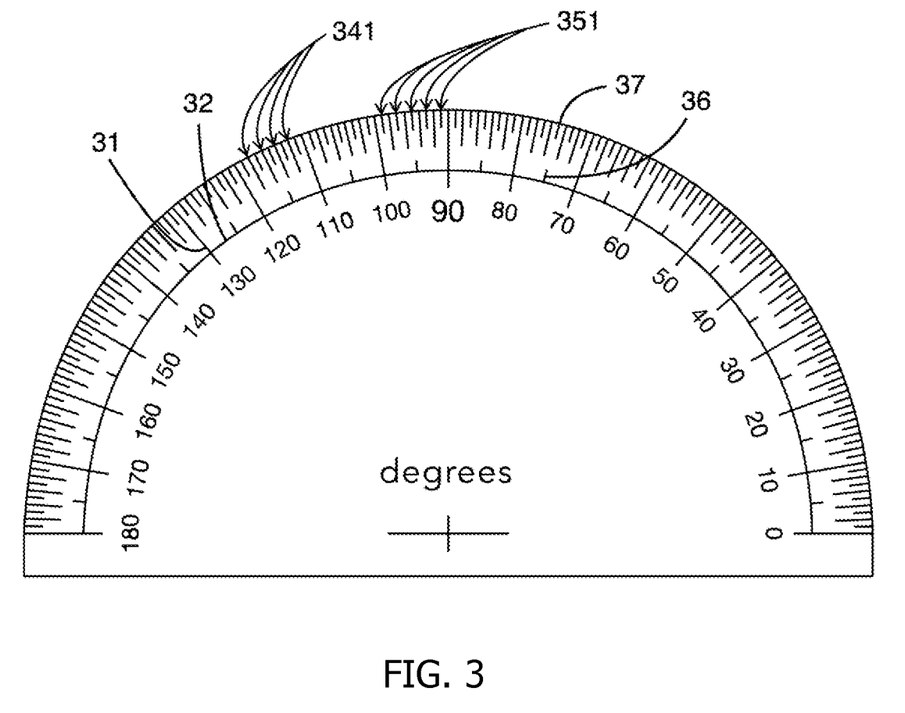
FIG. 3 is a plan view of a protractor that measures plane angles in degrees according to a further embodiment of the present invention.

The embodiment shown in FIG. 3 illustrates the current invention in use on a curved device, showing a protractor for measuring plane angles. Rather than millimeters, this tool is graduated in degrees, and the graduations alternate in length along the edge. The longest graduations 31 recur every ten degrees, and cross an inner arc parallel to the edge 32, which is the simple scale in this embodiment. Between them, those degrees ending in even digits 341 are longer the those degrees ending in odd digits 351. Another mark 36 is connected to the simple scale 32. The mark 36 points in the direction of the edge at those degrees ending in five 37.

Figure 4:
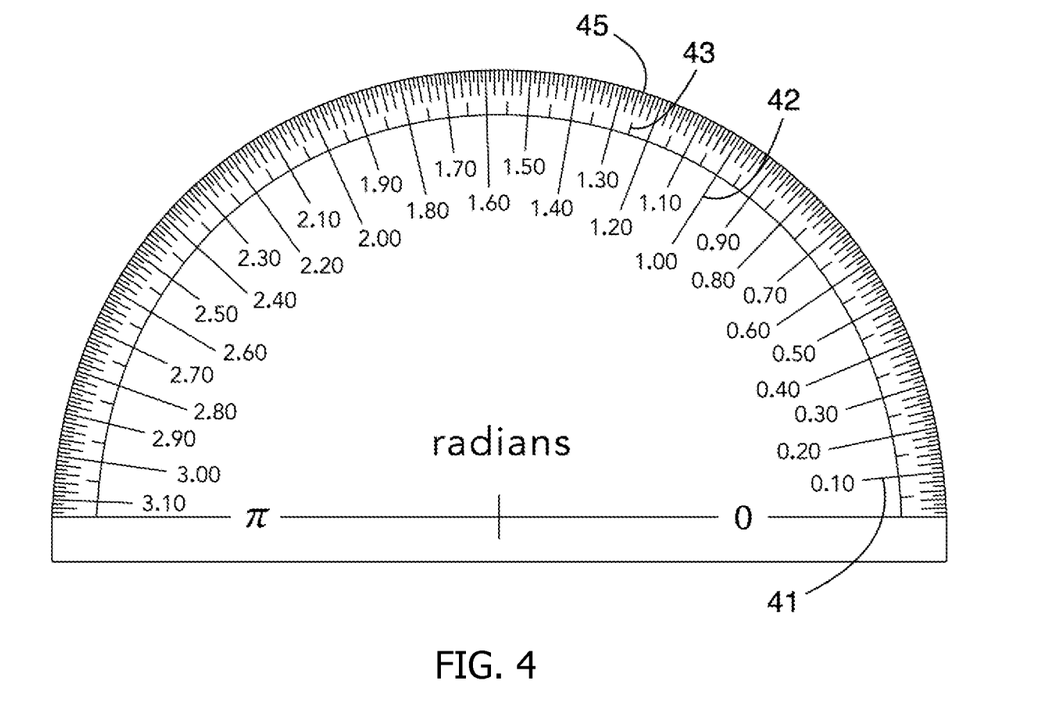
FIG. 4 is a plan view of a protractor that measures plane angles in radians according to a further embodiment of the present invention.

The embodiment shown in FIG. 4 illustrates a protractor with the numbered graduations progressing by one tenth of a radian 41. The scale at the outer edge has alternating graduations corresponding to hundredths of a radian. If the instrument is manufactured at the usual size, these graduations will be more closely spaced than millimeters. Ideas discussed in the background art, such as adding small dots or additional numbers over certain graduations, would not be practical here.

One radian 42 is the angle formed by a distance at the outer edge which is equal to the radius of the circle. As in the previous embodiment, the simple scale comprises an inner arc parallel to the edge, and on this are a series of marks 43 pointing to each graduation located at the halfway point of the fine scale 45. The numbered graduation lines, such as 41 and 42, also cross the simple scale.

Figure 5A:
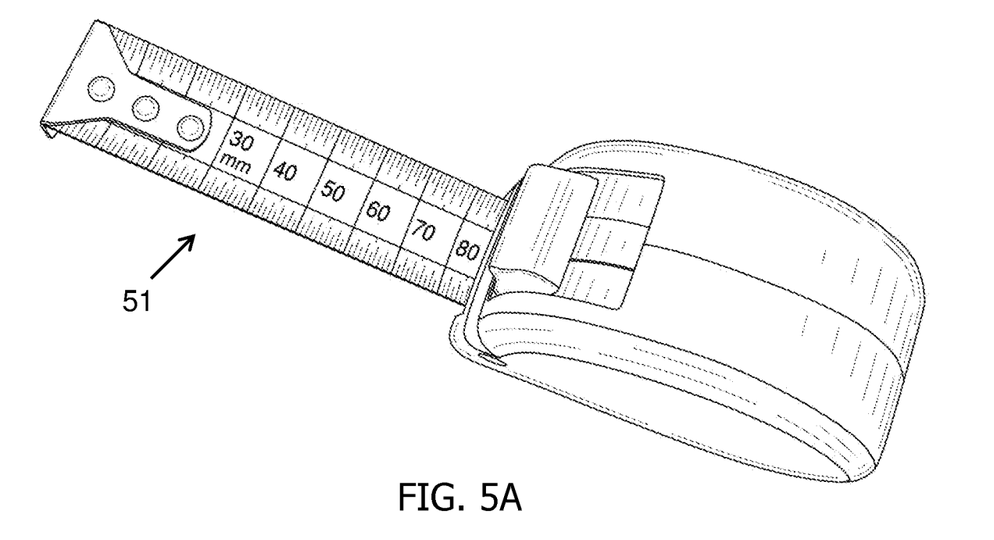
FIG. 5A is a perspective view of a retractable measuring tape with millimeter numeration according to a further embodiment of the present invention.
Figure 5B:
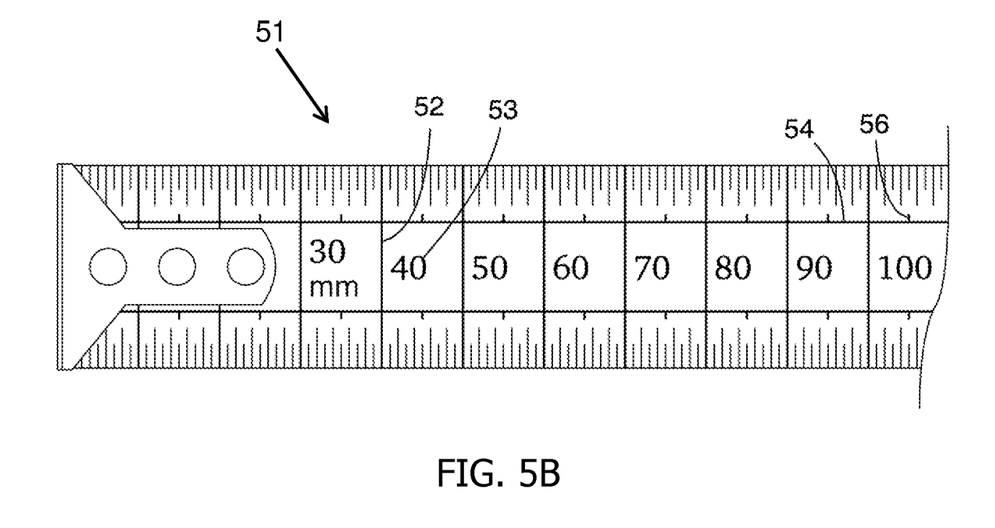
FIG. 5B is a plan view of the beginning of the measuring tape of FIG. 5A.

FIG. 5A illustrates the invention in use on a retractable millimeter measuring tape. The tape blade 51 is shown in a perspective view, and also in a plan view in FIG. 5B. In this embodiment, the millimeter graduations alternate in length as in previous embodiments, but the main graduation lines every ten millimeters 52 span the entire width of the tape, and have a thicker line than the other graduations. Since the tape is to be read from left to right, the numerals 53 are placed to the right. This practice divides the tape into segments. The first portion of the numeral is correct for all millimeters within that segment. Only the final zero may need to be changed. This can easily be done by counting, from left to right, the millimeters within that segment. As in previous embodiments, the simple scale 54 includes marks at the halfway point 56 that indicate the millimeter graduations ending in five.

Figure 5C:
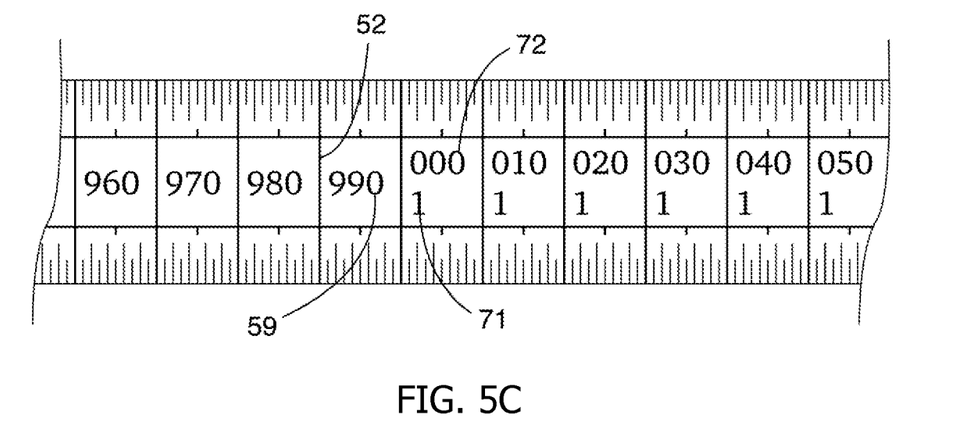
FIG. 5C is a plan view of the measuring tape of FIG. 5A in the region of one thousand millimeters.

Referring to FIG. 5C, this is a plan view of the tape indicia in the region of of one thousand millimeters. Numerals of one thousand and above are hard to fit in the available space without making them exceedingly small. The main graduation lines 52 span the width of the tape, with an indicating number placed to the right 59. Once the numeral reaches one thousand, the remaining three digits 72 are placed in a different row from the first part of the numeral, that now designates one meter 71.

Figure 5D:
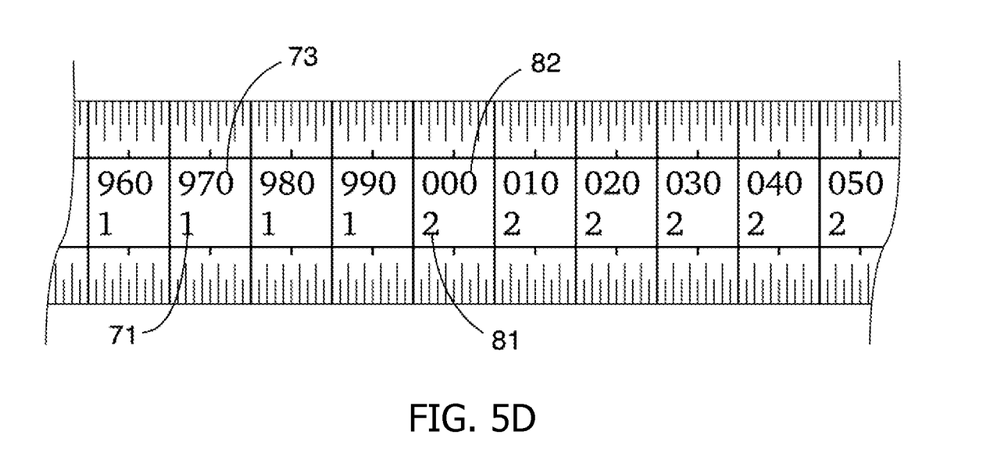
FIG. 5D is a plan view of the measuring tape of FIG. 5A in the region of two thousand millimeters.

FIG. 5D is a plan view of the tape indicia in the region of two thousand millimeters. This also shows the first part of the numeral designating one meter 71, but the remaining three digits 73 refer to a distance further along in the tape. Next, the numeral reaches two thousand, and the part of the numeral designating two meters 81 is placed in a different row from the remaining three digits 82.

With this arrangement, the end user first scans the meter numeral at the bottom. The side that this is on will indicate the graduation line to which the entire numeral refers. After this, the three digits can be read that indicate ten millimeter segments. Next, the halfway point is perceived, and finally the desired millimeter graduation. If a manufacturer thought the end user was more likely to measure from the bottom edge, the two rows could be reversed, and the last three digits would be placed below the first part of the numeral.

Figure 6A:
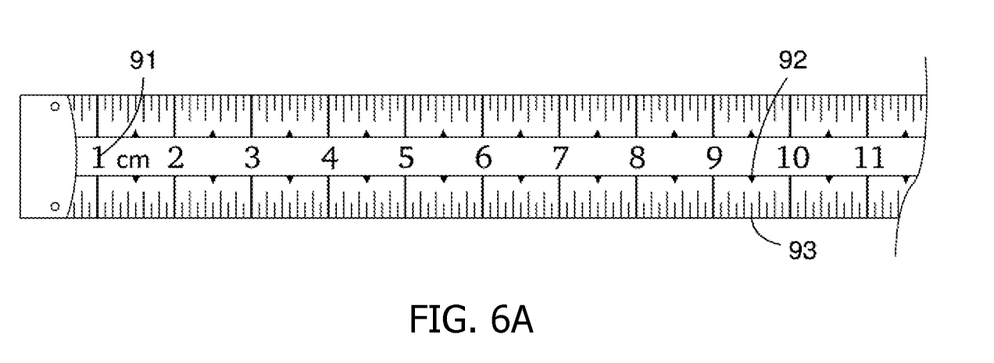
FIG. 6A is a plan view of the beginning of a sewing tape with centimeter numeration according to a further embodiment of the present invention.

Referring to FIG. 6A, this embodiment comprises a measuring tape used by tailors, also called a sewing tape. These do not have a carrying case, and are typically more narrow than tapes used in construction. Since centimeters are commonly used for clothing sizes, the numbers 91 refer to this unit. In this embodiment, the marks on the simple scale that indicate the midpoint between the numbered lines are in the shape of a triangle 92, and these point towards the edge to the half-centimeter graduations of the fine scale 93.

Figure 6B:
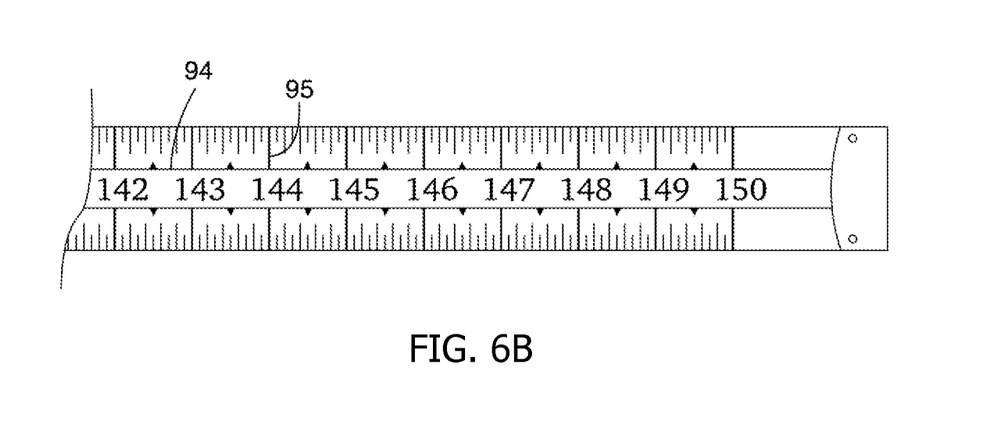
FIG. 6B is a plan view of the end of the sewing tape of FIG. 6A.

FIG. 6B comprises the end portion of this sewing tape. The simple scales parallel to each edge 94 join with the longest graduations 95 at every centimeter. These graduations 95 are made with a thicker line in this embodiment, but they do not extend past the simple scale lines 94, because this sewing tape is not as wide as the instruments in previous embodiments.

The invention presented here could also be used with US customary units, such as decimal inches or scale rulers for civil engineers. In addition, some of these embodiments are suitable for measuring tapes with an adhesive backing, as well as those made from the usual materials.

It will be apparent to the skilled artisan that the embodiments described above are specific examples of a broader invention of greater scope than any of the singular descriptions taught.

The invention claimed is:

1. A measuring tool for measuring a decimal-based measurement, comprising:
 a graduated instrument with a top edge and a bottom edge;
 along the top edge of the instrument, a first series of graduation lines that are uniformly spaced at single intervals of a larger measurement unit;
 along the top edge of the instrument, a second series of graduation lines that are located between the first series of graduation lines; wherein the second series of graduation lines are at even number intervals of a smaller measurement unit; wherein the larger measurement unit consists of ten of the smaller measurement units; wherein the second series of graduation lines are shorter in length than the first series of graduation lines;
 along the top edge of the instrument, a third series of graduation lines that are located between the first series of graduation lines; wherein the third series of graduation lines are at odd number intervals of the smaller measurement unit; wherein the third series of graduation lines are shorter in length than the second series of graduation lines;
 a scale line that runs parallel to the top edge of the instrument; wherein the scale line is offset away from the top edge of the instrument; wherein the first series of graduation lines intersect the scale line; and
 a series of marks that extend from the scale line and point towards the top edge; wherein the series of marks are located equidistantly between adjacent pairs of the first series of graduation lines; wherein the series of marks are unconnected to the second and third series of graduation lines.

2. The measuring tool of claim 1, wherein the measuring tool is a ruler or tape measure, the larger measurement unit is a centimeter, and the smaller measurement unit is a millimeter.

3. The measuring tool of claim 1, wherein the measuring tool is a protractor, and either (i) or (ii):
 (i) wherein the larger measurement unit is ten degrees and the smaller measurement unit is a single degree; or
 (ii) wherein the larger measurement unit is 0.1 radians and the smaller measurement unit is 0.01 radians.

4. The measuring tool of claim 1, wherein the first series of graduation lines extend from the top edge to the bottom edge of the instrument.

5. The measuring tool of claim 1, wherein the series of marks that extend from the scale line have a line shape.

6. The measuring tool of claim 1, wherein the series of marks that extend from the scale line have a triangle or arrow shape.

* * * * *